(No Model.)
A. DICKEY.
MOLDING MACHINE.
No. 594,233.
Patented Nov. 23, 1897.
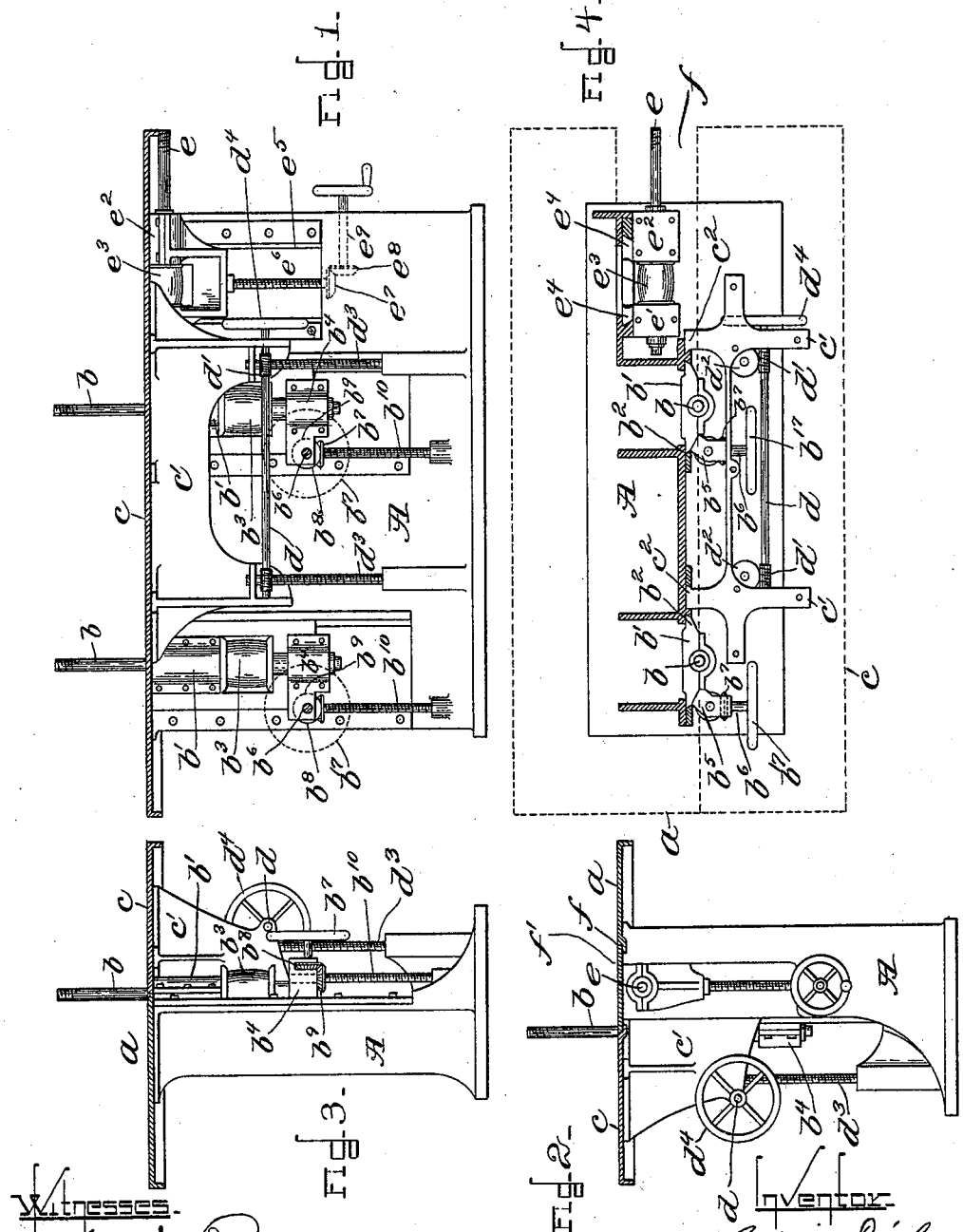

UNITED STATES PATENT OFFICE.

ADAM DICKEY, OF BOSTON, MASSACHUSETTS.

MOLDING-MACHINE.

SPECIFICATION forming part of Letters Patent No. 594,233, dated November 23, 1897.

Application filed January 22, 1897. Serial No. 620,234. (No model.)

*To all whom it may concern:*

Be it known that I, ADAM DICKEY, of Boston, county of Suffolk, State of Massachusetts, have invented an Improvement in Molding-Machines, of which the following description, in connection with the accompanying drawings, is a specification, like letters on the drawings representing like parts.

In molding-machines adapted for irregular work the cutters have heretofore been secured to vertical spindles which projected above the table which is provided for supporting the work, and adjusting devices have been provided for vertically adjusting said spindles with their cutters bodily, thereby moving the cutters toward and from the table. In practice these spindles must be made quite short, so as not to vibrate unduly when revolving, as such vibration of the spindles would result in breaking the cutters and in the production of inaccurate work, and consequently the range of adjustment of the cutters toward and from the table has been very limited and the machine thus adapted for small work only.

This invention has for its object to improve the construction of a molding-machine of this class to the end that a much greater range of adjustment is afforded, adapting it for use on large work, much larger than it has heretofore been possible to do with irregular molding-machines now on the market.

In accordance with this invention the vertical spindles to which the cutters are attached have their bearings in boxes which are adapted to slide in vertical guideways provided for them, and means are provided for adjusting said cutter-carrying spindles vertically. The table is divided longitudinally, one part of which is stationarily supported on the main frame and has the vertical cutter-carrying spindles located at the front side or edge, and the other part is located in front of said cutter-carrying spindles and is supported upon a frame which is adapted to slide in vertical guideways provided for it, and means are provided for adjusting said movable table up and down independent of but with relation to the stationary table and cutter-carrying spindles, so that said table shall occupy a position in a plane with the stationary table or above or below said plane.

Figure 1 shows in front elevation a sufficient portion of a molding-machine embodying this invention to illustrate the same; Fig. 2, a right-hand end view of the machine shown in Fig. 1; Fig. 3, a left-hand end view of the machine shown in Fig. 1, and Fig. 4 a plan view and partial section of the machine shown in Fig. 1.

The main frame A is of suitable shape and construction to support the operating parts, it being composed, essentially, of a base and a vertical or upright portion having a flat-surfaced top upon which the stationary table $a$ is placed. Two vertical spindles $b$ $b$ have their bearings in boxes $b'$ $b^4$, which are formed integral and either or both of which are formed with dovetailed or other shaped guides $b^2$, fitted to slide vertically in correspondingly-shaped guideways formed in the main frame. $b^3$ represents band-pulleys on said vertical spindles $b$. These vertical spindles are located at the front side or edge of the stationary table $a$. In a projection $b^5$ on said bearing-box $b^4$ a shaft $b^6$ has its bearings, which has secured to it a hand-wheel $b^7$, by means of which it is turned, and also has secured to it a bevel-pinion $b^8$, which engages the bevel-pinion $b^9$, which is secured to the upper end of a screw $b^{10}$, which turns in the frame of the machine. By turning the hand-wheel $b^7$ in one or the other direction the cutter-carrying spindle $b$ will be moved up or down.

$c$ represents a table of more or less rectangular shape and supported upon a frame $c'$, which is formed with dovetailed or other shaped guides $c^2$, fitted to slide up and down in correspondingly-shaped guideways provided in the main frame. This table $c$ occupies a position in front of the stationary table $a$ and spindles $b$, and it may be supported flush with the top of the table $a$, or it may be lowered any desired distance with relation thereto, or, if desired, it may be raised.

As a means of moving the table $c$ up and down I have herein provided a shaft $d$, having thereon at or near each end a worm $d'$, and said shaft has its bearings in the supporting-frame $c'$ of the table, and said worms $d'$ $d'$ engage worm-wheels $d^2$, secured to the upper ends of large screws $d^3$ $d^3$, which turn in the main frame of the machine. The table is thus supported by the screws $d^3$ $d^3$ and is caused to move up and down in the guideways provided for it by turning said screws, which is done by turning the hand-wheel $d^4$, which is secured to the right-hand end of said worm-shaft $d$, and thereby turning the worm-wheels, which are secured to the upper ends of said screws. The table $c$ is thus adjusted independently of the cutter-carrying spindles $b$.

The range of adjustment of the table $c$ is quite as great as that of the cutter-carrying spindles $b$, and hence double the ordinary adjustment can be obtained and work twice as large can be operated upon by the machine.

Beneath the top of the stationary table $a$ a horizontal cutter-carrying spindle $e$ is located in bearing-boxes $e'$ $e^2$, provided for it, said spindle having secured to it a band-pulley $e^3$, and the bearing-boxes $e'$ $e^2$ of said horizontal cutter-carrying spindle $e$ are formed with dovetailed or other shaped guides $e^4$, which are fitted to slide up and down in guideways $e^5$, formed in the main frame. To thus move vertically the horizontal cutter-carrying spindle, a screw $e^6$ is provided, which supports the same, having at its lower end a bevel-pinion $e^7$, which is engaged by a bevel-pinion $e^8$, secured to a shaft $e^9$, having its bearings in the main frame and having attached to it a hand-wheel, by means of which it may be turned. An opening $f$ is made in the top of the stationary table $a$, beneath which said horizontal cutter-carrying spindle is located, and said opening $f$ is normally closed by a slide or lid $f'$ when said spindle is in out-of-use position. When it is desired to use said spindle, said slide $f'$ will be withdrawn and the spindle raised by means of the adjusting device provided for it into proper working position. When the slide $f'$ is withdrawn and the horizontal cutter-carrying spindle raised into the desired working position, pieces of wood may be fitted into the opening $f$, which is at such time exposed, to close it, according to the work to be done.

I am aware that machines of different types and for different uses have been provided with adjustable tables; but I am not aware that an irregular molding-machine has ever been constructed having a stationary table, vertical spindles at the front edge thereof, and an adjustable table in front of said stationary table, the range of adjustment of which was sufficient to enable said table to be held in a plane flush with the stationary table or above or below said plane.

I claim—

In an irregular molding-machine, the combination of the main frame, the stationary table $a$ thereon, the rising-and-falling table $c$ and its supporting-frame $c'$, and means for adjusting said table $c$ to a plane flush with said table $a$ or above or below said plane, the front edge of said table $a$ and the rear edge of said table $c$ approximately abutting when said tables occupy the same plane, and the vertical cutter-carrying spindles $b$ located between the abutting edges of said tables $a$ and $c$, and means for raising and lowering them, substantially as described.

In testimony whereof I have signed my name to this specification in the presence of two subscribing witnesses.

ADAM DICKEY.

Witnesses:
B. J. NOYES,
HARRY O. ROBINSON.